UNITED STATES PATENT OFFICE.

KRISTIAN BIRKELAND, OF CHRISTIANIA, NORWAY.

PROCESS OF TREATING SULFID ORES AND OTHER METALLIC SULFIDS.

1,121,606.  Specification of Letters Patent.  Patented Dec. 22, 1914.

No Drawing.  Application filed January 23, 1913.  Serial No. 743,847.

*To all whom it may concern:*

Be it known that I, KRISTIAN BIRKELAND, a subject of the King of Norway, residing at Christiania, Norway, have invented certain new and useful Improvements in the Process of Treating Sulfid Ores and other Metallic Sulfids; and I do hereby declare the following to be a full, clear, and exact description of the invention, such as will enable others skilled in the art to which it appertains to make and use the same.

This invention has for its object a process of treating sulfid ores and other metallic sulfids for the purpose of completely removing the sulfur.

Prior to the present application various experiments have been made to decompose metallic sulfids by treatment with highly heated steam, for the purpose of establishing a metallurgical process based upon this reaction. Thus in 1836 the results of some experiments made by Regnault were published (*Ann. de Chemie* L XII). By these prior experiments one did not however arrive at results of any importance in practical metallurgy. The applicant has now found that the reason why said prior experiments have failed were that the temperatures employed were not sufficiently high and by numerous careful experiments it has been ascertained that very useful results are obtained when the process is carried out by means of steam of such high temperatures preferably from 800° C. to 1600° C. as are easily obtained by passing the steam through the electrical flame arc furnaces of the modern type. These experiments show that it is practically possible to use water vapors of a very high temperature on an industrial scale for the purpose of decomposing sulfid materials so as to obtain pure metals, either directly or in combination with a preliminary process, by means of which is first obtained an oxid (in this process the vapor may also be mixed with hydrogen) which is however not consumed in the process but only serves the purpose of regulating the state of equilibrium. The working of the process depends principally upon the three following factors: (1) the temperature; (2) the quantity of water vapor; (3) the quantity of hydrogen. For instance at a comparatively low temperature sulfid of zinc is transformed according to the following equation:

$$ZnS + H_2O = ZnO + H_2S.$$

Whereas by a higher temperature the transformation is performed according to the following equation:

$$ZnS + 2H_2O = Zn + SO_2 + 2H_2$$

and by a still higher temperature:

$$ZnS + 3H_2O = ZnO + SO_2 + 3H_2.$$

Now the very important observation has been made that the reaction takes place much faster at higher temperatures than at lower temperatures, and the utilization of the method as a metallurgical process is due to the use of very high temperatures.

For ferrous sulfid the corresponding series of reactions are:

$$FeS + H_2O = FeO + H_2S.$$
$$3FeS + 4H_2O = Fe_3O_4 + 3H_2S + H_2.$$
$$2FeS + 3H_2O = Fe_2O_3 + 2H_2S + H_2.$$
$$FeS + 2H_2O = Fe + SO_2 + 2H_2.$$
$$2FeS + 5H_2O = Fe_2O_3 + H_2S + SO_2 + 4H_2.$$
$$FeS + 3H_2O = FeO + SO_2 + 3H_2.$$
$$2FeS + 7H_2O = Fe_2O_3 + 2SO_2 + 7H_2.$$

For sulfid of potassium one has the following series:

$$K_2S + H_2O = K_2O + H_2S.$$
$$K_2S + 2H_2O = 2KHO + H_2S.$$
$$K_2S + 4H_2O = 2KHO + SO_2 + 3H_2.$$

With other metal sulfids similar results are attained. By utilizing these reactions in metallurgy the proceedings may consist in placing the metal sulfid in closed receptacle, through which is conducted a current of very highly heated (glowing) steam.

The gases escaping from the receptacle are treated in purifying apparatus or other suitable devices, so that the hydrogen is extracted. The latter or part of the latter may then be sent again through the electric furnace together with the steam so as to directly obtain pure metal. Or the process may be divided in two so that a metal oxid is obtained by the reaction of the vapor, whereupon said oxid is treated with hydrogen to be reduced to pure metal.

Of course the details of the process in the industrial application of same will vary according to each case. Thus by treating materials which will produce sulfur by distillation in an inactive atmosphere the sulfur will be distilled off first and collected separately. Thereupon the remaining metal sulfids are subjected to the action of the highly heated steam or a mixture of steam with hydrogen or watergas.

The pure metals produced can be obtained from the resulting mixture by distillation or melting. The metal sulfid may be treated in a molten condition so that the process will then turn out as a bessemerizing.

The process of course should be conducted so, that the sulfur expelled is utilized as a byproduct as pure sulfur or as sulfureted hydrogen or sulfurous acid.

I claim:

The process of treating sulfid ores and other metallic sulfids with superheated steam for removing the sulfur, which comprises superheating the steam to substantially the temperature of a flaming arc, passing said steam through the sulfids, separating hydrogen from the resulting gases and returning it with fresh quantities of highly heated steam for treating the material.

In testimony that I claim the foregoing as my invention, I have signed my name in presence of two subscribing witnesses.

KRISTIAN BIRKELAND.

Witnesses:
M. E. GULBORENSEN,
RUTH LINDSTIAN.